United States Patent [19]

Giers

[11] Patent Number: 5,862,502

[45] Date of Patent: Jan. 19, 1999

[54] CIRCUIT ARRANGEMENT FOR SAFETY-CRITICAL CONTROL SYSTEMS

[75] Inventor: Bernhard Giers, Rossdorf, Germany

[73] Assignee: ITT Automotive Europe GmbH, Germany

[21] Appl. No.: 647,935

[22] PCT Filed: Nov. 4, 1994

[86] PCT No.: PCT/EP94/03623

§ 371 Date: May 31, 1996

§ 102(e) Date: May 31, 1996

[87] PCT Pub. No.: WO95/15518

PCT Pub. Date: Jun. 8, 1995

[30] Foreign Application Priority Data

Dec. 2, 1993 [DE] Germany .................. 43 41 082.0

[51] Int. Cl.$^6$ .............. G05B 9/03; B60K 28/16
[52] U.S. Cl. .............. 701/71; 701/76; 303/122; 303/122.02
[58] Field of Search .................. 701/71, 75, 76; 303/122, 122.02, 122.03, 122.04, 122.05

[56] References Cited

U.S. PATENT DOCUMENTS

| | | | |
|---|---|---|---|
| 3,579,200 | 5/1971 | Davis et al. | 395/185.01 |
| 3,618,015 | 11/1971 | Homonick | 371/5.1 |
| 4,085,979 | 4/1978 | Leiber et al. | 303/122.08 |
| 4,096,990 | 6/1978 | Strelow | 395/182.09 |
| 4,198,678 | 4/1980 | Maatje et al. | 701/70 |
| 4,277,844 | 7/1981 | Hancock et al. | 371/37.4 |
| 4,358,823 | 11/1982 | McDonald et al. | 395/182.09 |
| 4,546,437 | 10/1985 | Bleckmann et al. | 303/122.07 |
| 5,001,641 | 3/1991 | Makino | 701/76 |
| 5,193,887 | 3/1993 | Bleckmann et al. | 303/122.07 |
| 5,265,944 | 11/1993 | Gloceri | 701/76 |
| 5,411,324 | 5/1995 | Zydek et al. | 303/122.05 |
| 5,440,487 | 8/1995 | Althoff et al. | 701/43 |
| 5,458,404 | 10/1995 | Fennell et al. | 303/176 |
| 5,671,394 | 9/1997 | Katsuta | 395/188.01 |
| 5,682,518 | 10/1997 | Inoue | 395/182.04 |
| 5,684,702 | 11/1997 | Phillips et al. | 701/76 |

FOREIGN PATENT DOCUMENTS

| | | |
|---|---|---|
| 0 201 356 | 11/1986 | European Pat. Off. . |
| 0 348 240 | 12/1989 | European Pat. Off. . |
| 0 496 509 | 7/1992 | European Pat. Off. . |
| 3 024 370 | 1/1982 | Germany . |
| 3 234 637 | 3/1984 | Germany . |
| 4 101 598 | 8/1991 | Germany . |
| 4 117 099 | 10/1992 | Germany . |
| 4 122 016 | 1/1993 | Germany . |
| 4 137 124 | 5/1993 | Germany . |
| 4 212 337 | 10/1993 | Germany . |

OTHER PUBLICATIONS

WOBIG, Karl–Heinz: *Vom Sinn (und Unsinn) der Diversität sicheren Steuerungen.* In: ZEV–Glas. Ann. 110, 1986, Nr. 12, pp. 417–422, Dec. 1986.

(List continued on next page.)

*Primary Examiner*—Tan Q. Nguyen
*Attorney, Agent, or Firm*—Ratner & Prestia

[57] ABSTRACT

A circuit arrangement for safety-critical control systems, for example, for the control of anti-lock brake systems, is based on an at least partly redundant processing of input data which are taken into account for generating control signals. The control system is disconnected upon non-correlation of the signals. A microprocessor system is provided for data processing and includes two or more central processor units permitting parallel processing of the input data. The output data of the CPUs are checked for correlation. Each write/read memory of the microprocessor system has a generator to generate a test information. The write/read memories and the read-only memories are extended by memory spaces for the test information. In every writing or reading access to the memories, the contents of the memory space is tested with the associated test information for correlation, and an error identification signal is generated in the absence of correlation or plausibility.

20 Claims, 3 Drawing Sheets

OTHER PUBLICATIONS

NIX, Heinz Gerhard: *Weniger Ausfälle und hohe Sicherheit durch redunante Automatisierungssysteme.* In: Siemens Energie & Automation 8, 1986, H. 1, pp. 2–4, (Month Is not available).

NIX, H.G.: *Sichere Steuerungen in Mikroprozessortechnik.* In messen + prüfen/automatik, Jul./Aug., 1984, pp. 368–370.

Kling, Uwe; Schrodi, Ewald: *Redundantes, hochverfügbares Automatisierungssytem AS22OH im dezentralen Prozessleitsystem Teleperm M.* In: Siemens–Energie—technik 5, 1983, H. 2, pp. 73–76, (Month is not available).

Nikolaizik, Jürgen; u.a.: *Fehlertolerante Mikrocomputersysteme,* Verlag Technik GmbH Berlin, 1990, pp. 68–77, (Month is not available).

Johnson, Barry W.: *Design and Analysis of Fault–Tolerant Digital Systems,* Addison–Wesley Publishing Company, 1989, pp. 81–92, pp. 315–319.

European Search Report dated Mar. 16, 1995.

CIRCUIT ARRANGEMENT FOR SAFETY-CRITICAL CONTROL SYSTEMS

This application is the U.S. national-phase application of PCT International Application No. PCT/EP94/03623.

BACKGROUND OF THE INVENTION

The present invention relates to a circuit arrangement which is intended for use in safety-critical control systems and comprises a microprocessor system including two or more central processor units or CPUs and by which input signals are evaluated and control signals are generated by data processing, that is at least in part redundant. Input data are processed in parallel and the results of the parallel, redundant data processing are compared and, in the absence of proper correlation, signals are generated for error identification or disconnection and disablement of the control system.

European patent application No. 0 496 509 discloses a circuit arrangement of this type which, exactly as the present invention, is intended for the control of an automotive vehicle anti-lock system. The information obtained by way of wheel sensors is processed in parallel in two microprocessors and the data processing results of the two microprocessors are correlated by another microprocessor to produce an error identification signal when the results differ. The anti-lock control system is disconnected in the presence of an error in order to ensure at least the conventional braking function.

German patent No. 32 34 637 discloses another example of a circuit arrangement of this type which is also used to control and monitor an anti-lock vehicle brake system. In this patent specification, the wheel sensor signals are supplied in parallel to and synchronously processed in two identically programmed microcomputers. The output signals (and intermediate signals) of the two microcomputers are checked for correlation to produce an error identification signal. One of the two microcomputers in this known circuit serves to generate braking pressure control signals and the other one serves to produce test signals. In this concept, a second microcomputer, that is identical in design and programming with the first microcomputer, is necessary especially for identification of a data processing error.

In still another prior art circuit arrangement disclosed in German patent publication No. 41 37 124, the input data are supplied to two microcomputers, of which only one performs the complete intricate signal processing operation. The second microcomputer mainly has a monitoring function. Therefore, the input signals are processed further after conditioning and after the generation of time derivatives by way of simplified control algorithms and a simplified control philosophy. The simplified processing is sufficient to generate signals which, by comparison with signals processed in the more sophisticated microcomputer, permit concluding proper operation. Although the cost of manufacture can be reduced by using a low-performance test microcomputer, in comparison with a system having two microcomputers of identical performance, the effort needed for error identification is still considerable.

Further, it is known in the art, for example, from U.S. Pat. No. 4,277,844 to write test information to a memory space and to compare the contents of the memory space with associated test information.

SUMMARY OF THE INVENTION

An object of the present invention is to provide a circuit arrangement of the previously mentioned type which results in reduced cost in manufacture compared to the above-mentioned prior art circuits and, nevertheless, detects and signals data processing errors with a high degree of reliability.

It has been found that this object can be achieved by a circuit arrangement which involves providing a microprocessor system with one single microprocessor that includes two or more central processor units or CPUs having common write/read memories associated with one generator each to produce test information and common read-only memories. The write/read memories and the read-only memories are extended by spaces in memory for the test information. The output data of a CPU, i.e., at least the calculating results or "data", are compared with the corresponding output data of the second CPU or the other CPUs for error identification. Each writing or reading access to the memories causes comparison or correlation of the contents of the memory space with the generated and supplied test information and generation of an error identification signal in the absence of correlation or "plausibility".

According to the present invention, the required high degree of reliability in the identification of data processing errors is achieved although a second microcomputer to redundantly process the input signals is eliminated. One single microcomputer is sufficient which generally differs from conventional circuits of this type only by redundant processing of input data by way of two CPUs and by a relatively minor extension of the memories by memory spaces for test information, by additional generators, including e.g. some exclusive OR gates, to generate the test information or redundance information, and by several additional comparators.

Extending the memories by spaces for the test information or redundance information is limited, depending on the redundance required, to a few percent, for example, 5 to 20%, of the space necessary for the memory. Compared to the complexity of the entire microprocessor system, the provision of two complete CPUs is of minor significance. The cost of manufacture for the microprocessor system according to the present invention which, preferably, is stored in a chip, thus, is only slightly increased compared to a comparable chip in the art. Thus, major economy in costs is achieved by limiting to only one microprocessor system in comparison to corresponding state of the art circuits having two processors.

In one embodiment of the present invention, the test information is provided in the form of redundance information. It is expedient to determine the even or odd parity of individual data bits to generate the test or redundance information. However, it is also possible to produce the sum of digits of the stored or transmitted data or of redundance information on the basis of a given polynomial.

According to another favorable embodiment of the present invention, the stored and/or the transmitted data are extended by a parity bit to generate the test or redundance information. The additional memory space required for this test bit is of hardly any significance.

The error identification signal causes disconnection or disablement of the microprocessor system according to another embodiment of the present invention. When using the circuit arrangement according to the present invention for anti-lock control, the control is terminated by disconnecting the microprocessor system, thereby ensuring the conventional braking function, i.e., the braking function without anti-lock control.

In a preferred aspect of the circuit arrangement according to the present invention, not only the CPUs but also other selected components of the microprocessor system, such as memories, input/output units, etc., are dually provided in this one-chip microprocessor system to enhance the redundance.

A safety-critical control system, for which the circuit arrangement according to the present invention is highly suited, is an automotive vehicle brake system with anti-lock control and/or traction slip control. In this arrangement, the sensor signals representative of the rotational behavior of the wheels and/or the driving behavior of the vehicle are processed in this circuit and evaluated to generate braking pressure control signals.

Further features, advantages and possible applications of the present invention will become apparent from the following description of special embodiments with reference to the accompanying drawings.

DETAILED DESCRIPTION OF THE INVENTION

Figure 1:
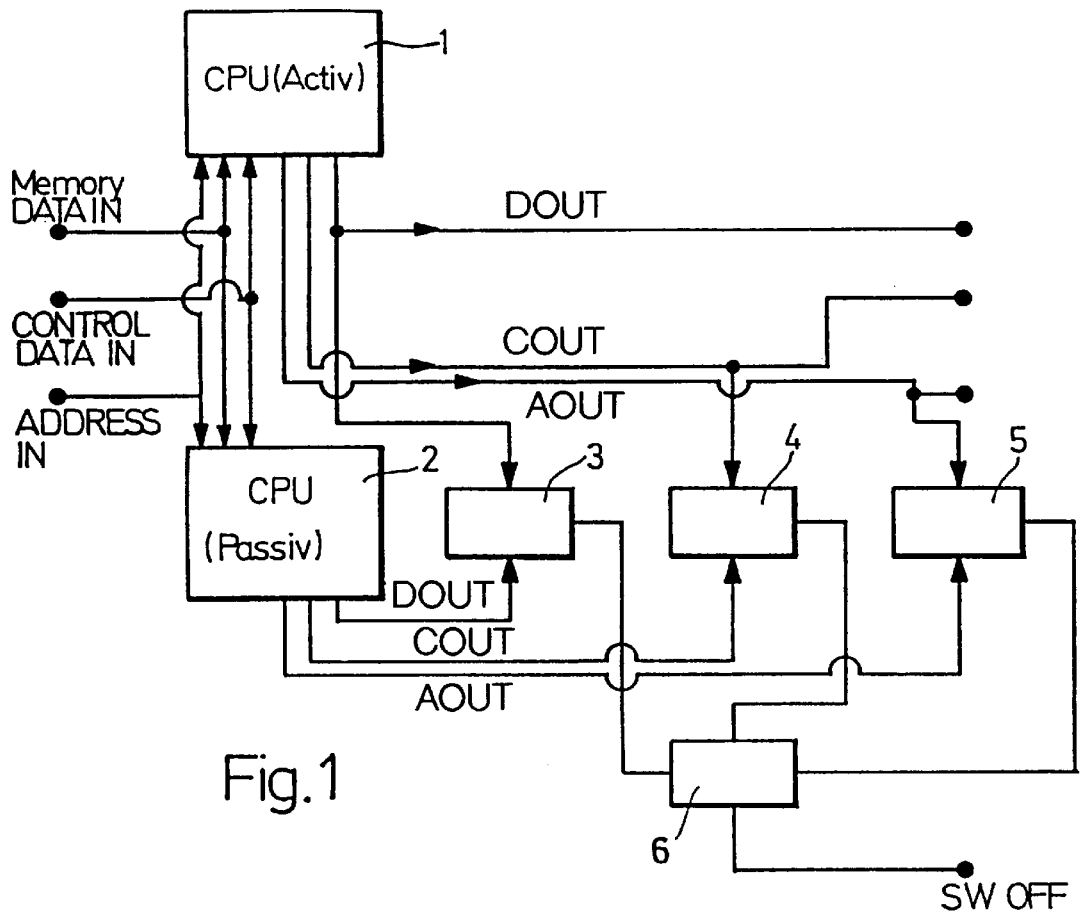
FIG. 1 is a block diagram which shows the interaction of the central processor units (CPUs), the associated comparators and the disconnecting function of a microprocessor system according to the present invention.

FIG. 1 shows the microprocessor system, according to the present invention, comprising two central processor units 1, 2, referred to as CPUs, to which the input signals or input data are supplied in parallel by way of bus systems, i.e., a data bus Memory DATA IN, a control bus CONTROL DATA IN and an address bus ADDRESS IN. CPU 1 is referred to as "active" because its output data are conducted for further processing on the bus systems D OUT, C OUT, A OUT. Conversely, CPU 2 is "passive" because it serves testing purposes only. Because both CPUs 1 and 2 are identically designed and programmed in the present embodiment, data processing errors can be identified by comparison of the output data of both units 1, 2. Therefore, the output data of both CPUs are compared for correlation by comparators 3, 4, 5. Each data bus, control bus and address bus has a comparator 3 or 4 or 5 of its own. Absence of proper data correlation is judged as a data processing error and a disconnecting or disabling signal is issued by gate 6.

Figure 2:
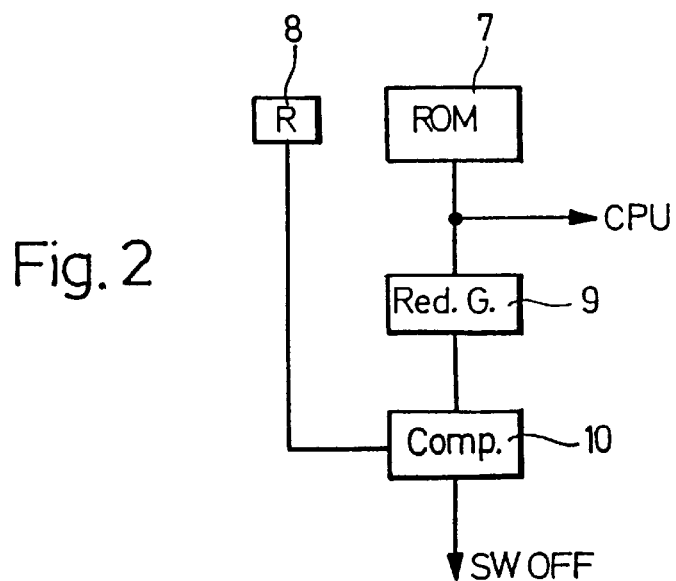
FIG. 2 is a block diagram of a read-only memory (ROM) and the associated testing components.

Thus, the microprocessor system according to the present invention provides 100% redundance with respect to data processing in the CPUs 1, 2. Checking and monitoring the memories is based on a different principle. As is shown in FIG. 2, a read-only memory (ROM) 7 is associated with another memory 8 for redundance information. In practice, the read-only memory 7 is extended by corresponding memory spaces to store the redundance information.

The data read in the memory 7 are furnished to a testing or redundance generator 9 including logic circuits to produce the test information. The test information produced by the generator 9 must correlate with the information stored in memory 8. A disconnecting or disabling signal is generated in a comparator 10 in the absence of correlation.

When the test information takes the shape of a parity bit, the generator 9 for generating the test or redundance information includes, for example, the necessary number of exclusive OR gates to determine the parity. This method permits identifying each single point error. Of course, simultaneous multiple point errors may also be identified by test information on the basis of two or more bits. It may also be appropriate to produce redundance information on the basis of polynomials and defined algorithms.

The explanations of FIG. 2 similarly apply to the reading of information in a write/read memory (RAM). According to the present invention, this write/read memory also is extended by several memory spaces for the redundance information.

Figure 3:
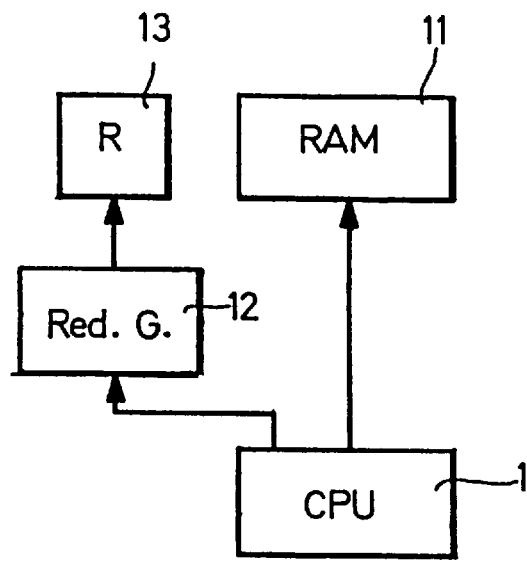
FIG. 3 is a block diagram of a write/read memory and the associated testing components.

Now referring to FIG. 3, in a writing access to a write/read memory 11, a generator 12, which corresponds to generator 9 of FIG. 2, produces test information which is stored in an additional memory 13, or in additional memory spaces in the associated write/read memory. In turn, there is a correlation or "plausibility" check in a reading access to the information.

Figure 4:
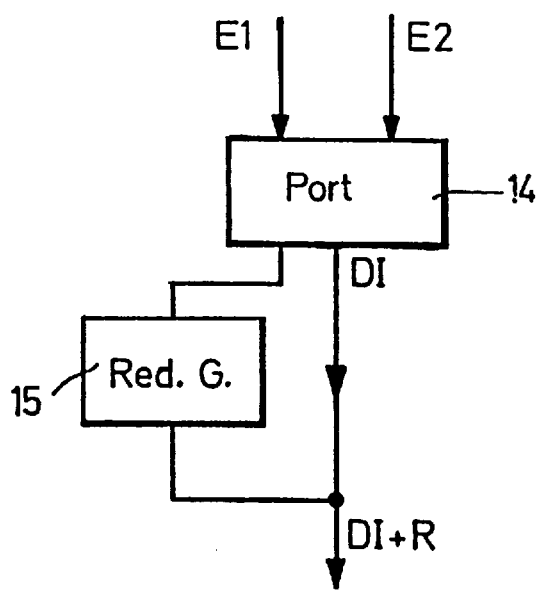
FIG. 4 is a block diagram of the connection of input and output units.

As can be seen in FIG. 4, the data supplied to the microprocessor system according to the present invention by an input unit 14 are checked similarly to the method of treatment explained hereinabove. Test or redundance information is produced in a generator 15. The testing operation is then performed as described when transmitting or further processing the data.

The input unit 14 receives, from the associated source, the input signals to be processed, which are dual railed, represented by the two input arrows E1, E2 in FIG. 4. The test redundance becomes effective only after the signals are taken up in the microprocessor system according to the present invention.

Principally, the number of pieces of information generated by the redundance generators is determined by the respective requirements with respect to identification of single point or multiple point errors. If the identification of single point errors is sufficient for an application, the redundance generator 9, 15 is provided by a chain of exclusive OR gates in the simplest case. When double point errors shall also be recognized, a plurality of redundance bits is formed, for example, by producing the sum of digits or adding all bits of a word. Thus, the "magnitude" of the test information can be varied as a function of the required safety with respect to simultaneously occurring errors.

The comparators 3, 4, 5 described in FIG. 1 can be provided, for example, by comparator circuits which "bit"-wise compare all pieces of information. A possible embodiment is the bit-wise comparison by the previously exclusive OR gates, the outputs of which are comprised by another OR gate.

The comparator 10 of FIG. 2 compares the information read from the memory 7, which is extended by the redundance information generated in the redundance generator 9, with the test information from the memory 8. This testing operation, in turn, is performed by way of the previously mentioned exclusive OR gates.

Reliability in error identification by way of the circuit arrangement according to the present invention can still be enhanced by the following provisions: the comparators and/or disabling paths can have a redundant design. Thus, a concealed error within a comparator or a disabling path is unable to prevent disconnection of the system when an error occurs.

It is, in principle, also possible to arrange a comparator outside the actual microprocessor chip. Because an external comparator is cyclically furnished with values from the chip, the comparator can check the time behavior of the CPUs by a second clock pulse supply and cause disconnection of the control system in the presence of an error. Both the data contents of the received information and the time behavior of the signals serve as test criteria.

An additional logic which selects specific pieces of information and conducts each nth result to the external comparator can be used to reduce the transmission bandwidth between the comparator and the CPUs. A selection system of this type permits reducing the number of checked random tests to a still smaller, yet still sufficient degree.

Further, it is principally possible to test only the test or redundance information received and the information calculated for the comparison by an external circuit. The number of signals transmitted to the external circuit can be reduced this way.

Figure 5:
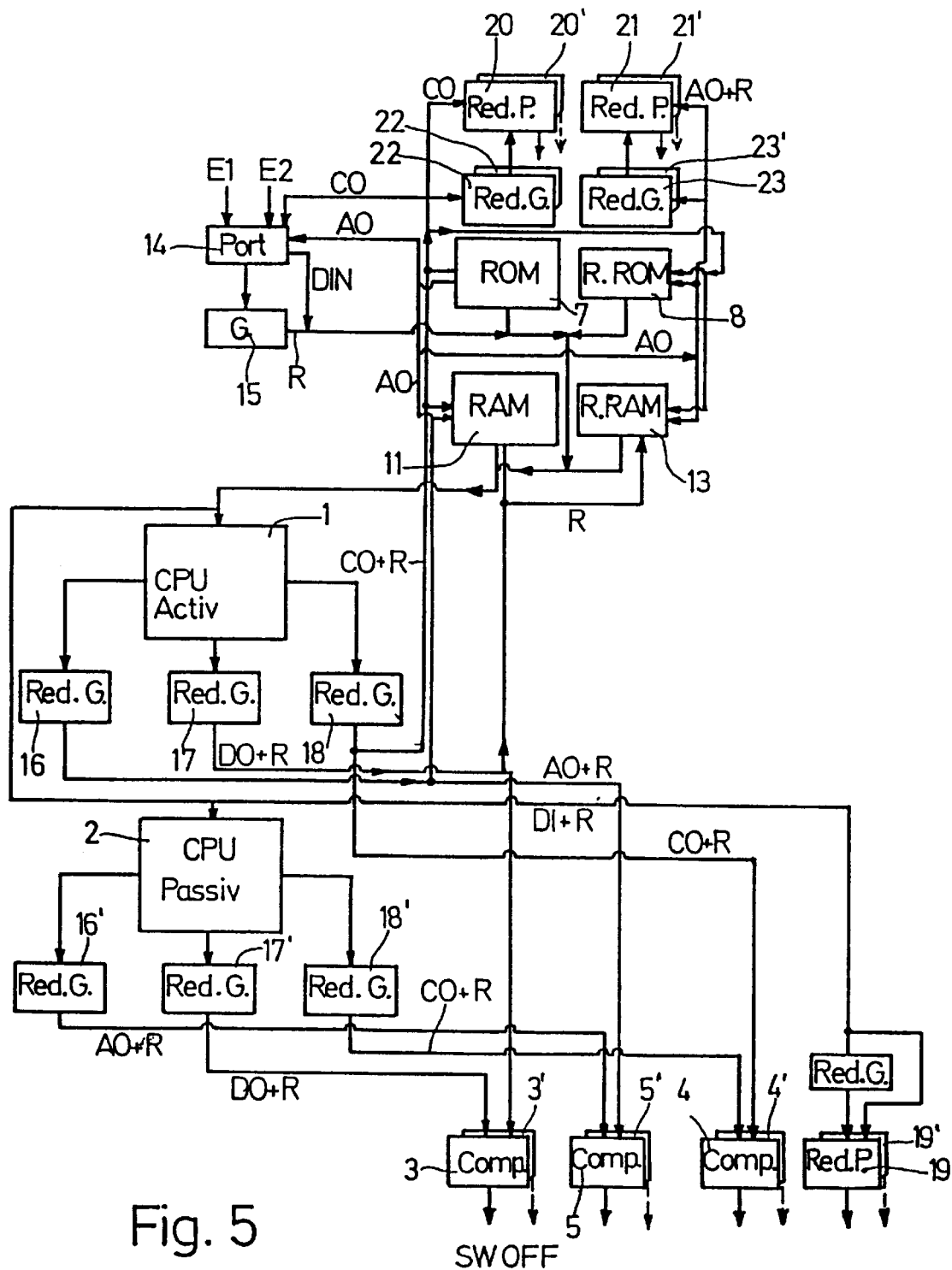
FIG. 5 is a block diagram of the connection of the basic components of a microprocessor system according to the present invention.

FIG. 5 serves to illustrate the interaction of the individual components of a microprocessor system according to the present invention, which have already been described or discussed. Parts in FIG. 5 identical with those in the embodiments of FIGS. 1 to 4 have been assigned like reference numerals.

The output data of the central processor units 1, 2 in FIG. 5 are referred to by DO (Data OUT), the address data by AO (Address OUT) and the sequence control data by CO (Control OUT). "R" refers to the associated test or redundance information. The input data are referred to by "I" (DI, AI, CI). In contrast to FIG. 1, the signal inputs of the central processor unit 1, 2 for the address and control data are not shown in FIG. 5 for the sake of clarity. Only the data input DI or DI+R is shown.

Different from the embodiment of FIG. 1, the outputs of the central processor units or CPUs 1, 2 are supplied to the comparators 3, 4 and 5 by way of redundance generators 16, 17, 18 or 16', 17', 18' which add test information, for example, a test bit, to the information transmitted. As indicated in FIG. 5, two comparators 3, 3'; 4, 4'; 5, 5' are connected in parallel. Each comparator is in a position to issue an error identification signal or disabling signal (Switch OFF). Another switch component 19, 19' is provided to check the input data (DI+R with "R" representing the test or redundance information). Switch component 19, 19' also generates a disabling signal SW OFF in the event of non-plausibility of information and the associated test signal.

Activation of the write/read memory RAM 11 along with the associated memory 13 for the test or redundance information and the read-only memory (ROM) 7 and the associated test memory 8 have already been explained in connection with the description of FIGS. 2 and 3. There is no difference over the embodiment of FIG. 5. The input unit 14 with the associated redundance generator 15 also has already been explained in connection with the description of FIG. 4. Again, two input signals E1, E2 are supplied in parallel.

To check the sequence control data (control data) and the address data, switch components 20, 20' and 21, 21' are also dually provided. Identification of non-correlation or lack of plausibility between the data and the associated test information by switch components 20, 20' and 21, 21' causes generation of a disabling signal SW OFF. The associated redundance generators are referred to by reference numerals 22, 22' and 23, 23'.

I claim:

1. A circuit arrangement for use in safety-critical control systems, comprising:
   (a) input means for receiving an input signal;
   (b) a microprocessor system including:
      (i) at least two central processor units for processing the input signal in parallel and each generating a respective output signal,
      (ii) a comparator for comparing said respective output signals and generating an error identification signal if the respective output signals do not correlate;
      (iii) at least one common memory having a writing access and a reading access;
      (iv) a test information generator corresponding to each at least one common memory for generating first test information corresponding to information to be written to said at least one common memory and second test information corresponding to information to be read from said at least one common memory; and
      (v) a test information memory corresponding to each at least one common memory for storing said first test information; and
   (c) means responsive to said writing access of said at least one common memory for causing the corresponding test information generator to generate said first test information and storing said first test information in the corresponding test information memory; and
   (d) means responsive to said reading access of the at least one common memory for causing the corresponding test information generator to generate said second test information, comparing said first test information with said second test information, and generating an error identification signal if said first test information and said second test information do not correlate.

2. Circuit arrangement according to claim 1 wherein the respective output signal generated by each central processor unit includes a data output signal, an address output signal, and a control output signal, which are compared with the corresponding output signals of the other central processor units, and the error identification signal is generated upon non-correlation.

3. Circuit arrangement according to claim 2, wherein the first test information and the second test information are redundance information.

4. Circuit arrangement according to claim 3, wherein the second test information includes even or odd bit parity of information to be read from the at least one common memory and the first test information includes even or odd bit parity of information to be written to the at least one common memory.

5. Circuit arrangement according to claim 3, wherein a first sum of digits or a first predetermined polynomial of information to be written to the at least one common memory is produced for generating the first test information, and a second sum of digits or a second polynomial of information to be read from the at least one common memory is produced for generating the second test information.

6. Circuit arrangement according to claim 5, wherein the information to be written to the at least one common memory is extended by a first parity bit for generating the first test information, and the information to be read from the at least one common memory is extended by a second parity bit for generating the second test information.

7. Circuit arrangement according to claim 6, wherein the input signal is processed synchronously by the at least two central processor units.

8. Circuit arrangement according to claim 7, wherein the error identification signal causes at least one of disconnection and disablement of the microprocessor system.

9. Circuit arrangement according to claim 8, wherein the microprocessor system further includes input/output components and bus systems which along with the at least one common memory and corresponding test information memory and test information generator are multiply provided, and operation of said microprocessor system is checked for correlation or plausibility by comparators for enhancing reliability in error identification.

10. Circuit arrangement according to claim 8, wherein that the circuit arrangement is part of an automotive vehicle brake system with anti-lock and/or traction slip control and serves to process signals representative of the rotational behavior of the vehicle wheels and/or the driving behavior of the vehicle, and to generate braking pressure control signals.

11. Circuit arrangement for safety-critical control systems, comprising:
   means for supplying input data;
   a single microprocessor having:
      (a) at least two central processor units,
      (b) a plurality of generators for producing test information,
      (c) a plurality of write/read memories one associated with each said generator and extended by memory spaces for the test information, and
      (d) a plurality of read-only memories extended by spaces in memory for the test information for:
      (a) evaluating said input data, and
      (b) generating control signals by data processing that is, at least, in part redundant, wherein:
      (a) said input data are processed in parallel,
      (b) results of the parallel, redundant data processing are compared, and
      (c) in the absence of proper correlation, signals are generated for error identification or disconnection and disablement of the control system;
   means for comparing output data of a first of said central processor units, with corresponding output data of a second of said central processor units for error identification; and
   means responsive to each writing or reading access to said memories for causing comparison or correlation of the contents of the memory space with the supplied test information and generation of an error identification signal in the absence of correlation or plausibility.

12. Circuit arrangement according to claim 11 wherein the calculating results or data and the addresses and/or the sequence control data are compared with the corresponding output data of said second central processor unit and the error signal is generated upon non-correlation.

13. Circuit arrangement according to claim 12 wherein the test information is provided as redundance information.

14. Circuit arrangement according to claim 13 wherein the even or odd bit parity of the individual data is determined for generating the test or redundance information.

15. Circuit arrangement according to claim 13 wherein the sum of digits of the figures representative of the individual stored or transmitted data, or a redundance information on the basis of a predetermined polynomial or algorithm is produced for generating the test information.

16. Circuit arrangement according to claim 15 wherein the stored and/or transmitted data are extended by a parity bit for generating the test or redundance information.

17. Circuit arrangement according to claim 16 wherein the input data in said central processor units are processed synchronously.

18. Circuit arrangement according to claim 17 wherein the error identification signal causes disconnection or disablement of the microprocessor system.

19. Circuit arrangement according to claim 18 further including additional comparators and wherein said microprocessor further includes input/output components and bus systems which, with said read only memories and said write/read memories, generate information which is checked for correlation and plausibility by said additional comparators to enhance the reliability in error identification.

20. Circuit arrangement according to claim 18 wherein said circuit arrangement is part of an automotive vehicle brake system with anti-lock and/or traction slip control and serves to process signals representative of the rotational behavior of the vehicle wheels and/or the driving behavior of the vehicle, and to generate braking pressure control signals.

* * * * *

UNITED STATES PATENT AND TRADEMARK OFFICE
CERTIFICATE OF CORRECTION

PATENT NO. : 5,862,502
DATED : January 19, 1999
INVENTOR(S) : Bernhard Giers

It is certified that error appears in the above-identified patent and that said Letters Patent is hereby corrected as shown below:

In claim 11, column 7, line 30, after the word "information" insert a paragraph return and indent the word "for".

Signed and Sealed this

Thirteenth Day of July, 1999

Q. TODD DICKINSON

Attest:

Attesting Officer

Acting Commissioner of Patents and Trademarks